United States Patent [19]

Jönsson et al.

[11] Patent Number: 4,897,111
[45] Date of Patent: Jan. 30, 1990

[54] METHOD FOR THE MANUFACTURE OF POWDERS FROM MOLTEN MATERIALS

[75] Inventors: Sigurd Jönsson, Alzenau; Michael Hohmann, Hanau; Gerhard Gross, Krefeld; Hans W. Bergmann, Echental, all of Fed. Rep. of Germany

[73] Assignee: Leybold Aktiengesellschaft, Hanau am Main, Fed. Rep. of Germany

[21] Appl. No.: 207,120

[22] Filed: Jun. 15, 1988

[30] Foreign Application Priority Data

Sep. 9, 1987 [DE] Fed. Rep. of Germany ....... 3730147

[51] Int. Cl.⁴ ............................................... B22F 9/06
[52] U.S. Cl. ......................................... 75/0.5 C; 425/7
[58] Field of Search .......................... 75/0.5 C; 264/12

[56] References Cited

U.S. PATENT DOCUMENTS 2,209,964  8/1940  Ferguson ........................... 75/0.5 C
3,720,737  3/1973  Klaphaak et al. ................. 75/0.5 C

FOREIGN PATENT DOCUMENTS 0215168  3/1987  European Pat. Off. .
 373365  4/1988  Fed. Rep. of Germany ..... 75/0.5 C
2595595  9/1987  France .

Primary Examiner—L. Dewayne Rutledge
Assistant Examiner—David Schumaker
Attorney, Agent, or Firm—Felfe & Lynch

[57] ABSTRACT

For a process for the manufacture of powders from molten materials by atomizing the melt to particles by means of fluid media and cooling the particles as they fall, a melting chamber (3) is provided which has a melting system (4) disposed in the melting chamber (3) and an atomizing tower (8) is provided which is associated with the atomizing system (9) and attached to the melting chamber (3). For the production of powders of finest particle size with high purity and uniformity, a plurality of nozzles (11, 12, . . .) which can be aimed in their holders at the molten stream, are used for projecting a low-boiling liquefied gas under a pressure of 50 to 700 bar against the molten stream (23) entering the atomizing tower (8).

9 Claims, 2 Drawing Sheets

METHOD FOR THE MANUFACTURE OF POWDERS FROM MOLTEN MATERIALS

BACKGROUND OF THE INVENTION

1. Field of the Invention

The invention relates to a method for the manufacture of powders from molten materials by using fluid media to atomize the melt to particles and cooling the particles during their fall, having a melting system, an atomizing system, and an atomizing tower associated with the atomizing system and attached to the melting chamber.

2. Discussion of Related Art

It is known that powders, such as powdered metals, can be produced by atomizing a melt (DOS 30 34 677). In this method a jet of the melt is disrupted by a gas or by a liquid such as water or oil, at a high relative velocity of the atomizing medium to the molten jet, to fine droplets which solidify in a cooling section that follows.

It has, however, been found to be disadvantageous and limiting that gas-atomized powders have only a coarse average particle size of typically 4 to 150 microns. Even in the case of powders produced by ultrasound only a gradual reduction of the average particle size has been achieved. To this is added the poor cooling action of the gas in the cooling section, especially below about 600° C., which in the case of alloys of metals, such as aluminum-base metals, for example, can lead to undesirable segregations during the manufacture of the powder.

In the case of powders atomized with water or oil smaller average particle sizes can be established than is possible by atomizing with gases. Powders are obtained, however, which have undesired reaction products at least on the surface of the powder particles, such as oxides, hydrides, carbides etc. (In the case of gas atomizing this can be prevented by the use of inert gases.)

Additional difficulties can result in the case of powders atomized with water or oil, due to the necessity of separating the powders from the atomizing medium.

Furthermore, a method is also known for the manufacture of fine metal powders, in which a stream of molten metal is introduced into an opening in a tank by the action of a gas flowing at ultrasonic velocity. The ratio of the gas pressure in the vicinity of the opening outside of the tank to the gas pressure inside of the tank is made greater than 5, and the gas flowing into the tank a temperature ranging between 0.7 and 1.5 times the solidification temperature of the metal (in ° K) before injection. The molten stream is first divided into fibers, these fibers being converted to droplets in the area of the pressure drop in the hot gas, and these droplets hardening into spherical metal powders (DPS 33 11 343). The molten metal is brought into contact with the gas at a point in the tank opening at which the gas pressure has dropped to less than 60 % of the pressure ahead of the opening. This previously known process makes it possible with relatively low energy consumption, to produce very fine powders with particle diameters of less than 40 microns, with a relatively narrow particle diameter distribution.

SUMMARY OF THE INVENTION

Now, it is the object of the present invention to find a method and an apparatus suitable for creating gas-atomized powders having a still finer particle size, and extreme uniformity and purity.

According to the invention this is accomplished by a method in which low boiling liquefied gas is projected under pressure through the atomizing apparatus against the molten stream entering the atomizing tower.

Preferably, the liquefied gas is under a pressure of more than 50 bar and is projected through one or more nozzles of the atomizing apparatus aimed at the molten jet, while a liquid gas jet emerging from a nozzle and the molten stream flowing perpendicularly downward out of the melting chamber form an angle with one another that is smaller than a right angle.

Advantageously, liquid nitrogen or liquid argon is projected against the molten stream with a pressure of 50 to 700 bar. The throughput of low-boiling liquefied gas is best adjusted so that the amount of heat which can be withdrawn from the melt by the liquid gas amounts to more than twice, preferably to 8 to 10 times the amount of heat that must be removed from the melt to cool it to ambient temperature.

It has been found desirable to cause the molten metal to enter into the atomizing tower under greater than atmospheric pressure, in order to assure that the molten stream will have a precisely definable quality, i.e., velocity, shape and uniformity.

Depending on the selected alloy components it may prove necessary to fuse the melt under vacuum and deliver it directly to the atomizing nozzles without the access of atmospheric oxygen. Likewise it may be desirable to precool the atomizing tower and to cool the atomizing medium, so that the gas streams emerging from the nozzle and aimed against the molten stream will remain as parallel as possible.

The apparatus for the practice of the method described above has preferably a heat exchanger inserted into the pressure line between the high-pressure pump and the nozzles, so as to cool the liquid gas below its boiling temperature.

To forestall undesired reactions between the ambient air and the melt entering the cooling tower, an inert gas atmosphere can advantageously be installed in the atomizing tower ahead of the atomizing nozzles.

To prevent any undesired contamination of the atomizing tower prior to the atomizing, the atomizing tower can be closed off from the melting chamber by a membrane or valve which will not melt until the instant of the impingement of the molten stream.

Preferably, the nozzles for the low-boiling liquefied gas are fastened to holders pivotingly mounted in the wall of the atomizing chamber, the position of the nozzles being variable with great precision from the outside, horizontally and vertically, in a range between 30 and 90 degrees.

Likewise it is desirable to mount the nozzles, which are preferably flat-jet or round-jet atomizing nozzles, for longitudinal displacement in their mounts and to make their distance from the molten stream reducible so as to prevent any expansion of the jet of the liquid gas.

Detailed Description of the Preferred Embodiments

Figure 1:
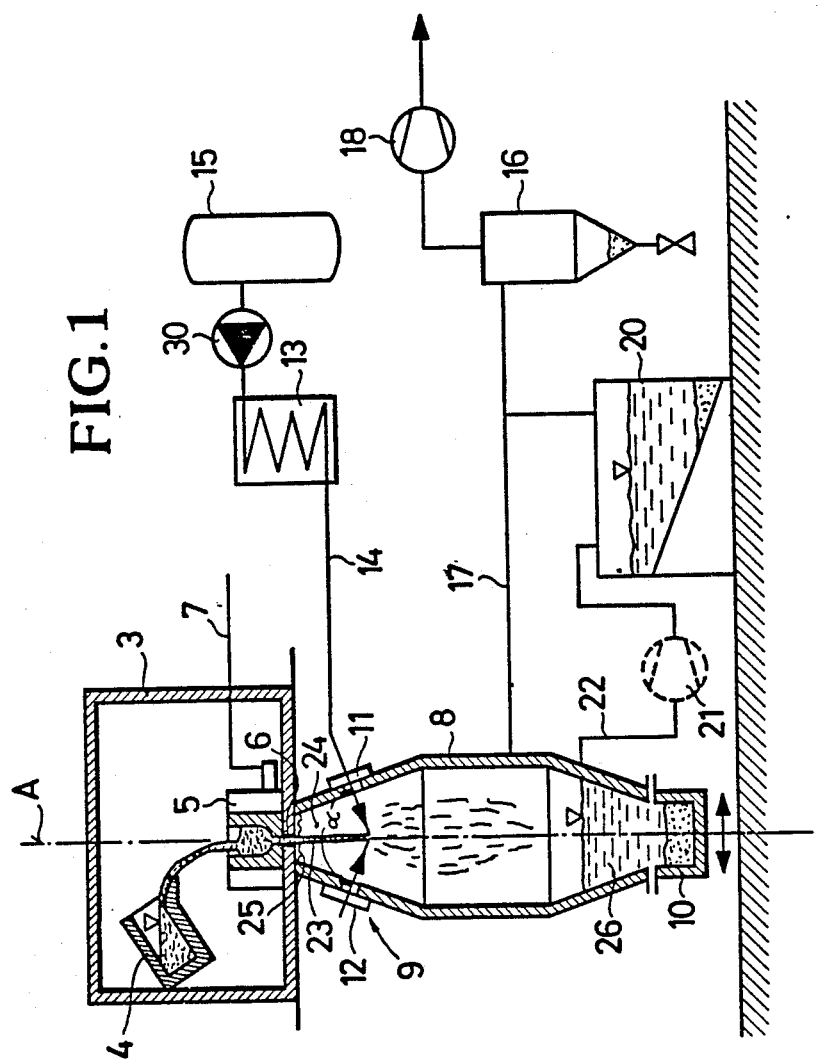
FIG. 1 is the diagram of an apparatus for the manufacture
of powders from a melt.

The apparatus consists essentially of a melting chamber 3, a melting system 4 disposed in the melting chamber 3, a heated crucible 5 with a pouring spout 6 and a first power supply line 7, the atomizing tower 8 disposed under the melting chamber 3 and having the atomizing system 9 and the accumulator 10, the gas supply tank 15 connected to the nozzles 11 and 12 of the atomizing system 9 by a pressure line 14 with high-pressure pump 30 and a condenser 13 inserted in the latter, the centrifugal air separator 16 with aspirating line 17 and aspirating blower 18, and finally the powder collector 20 with the suction pump 21 inserted into the suction line 22.

Figure 2:
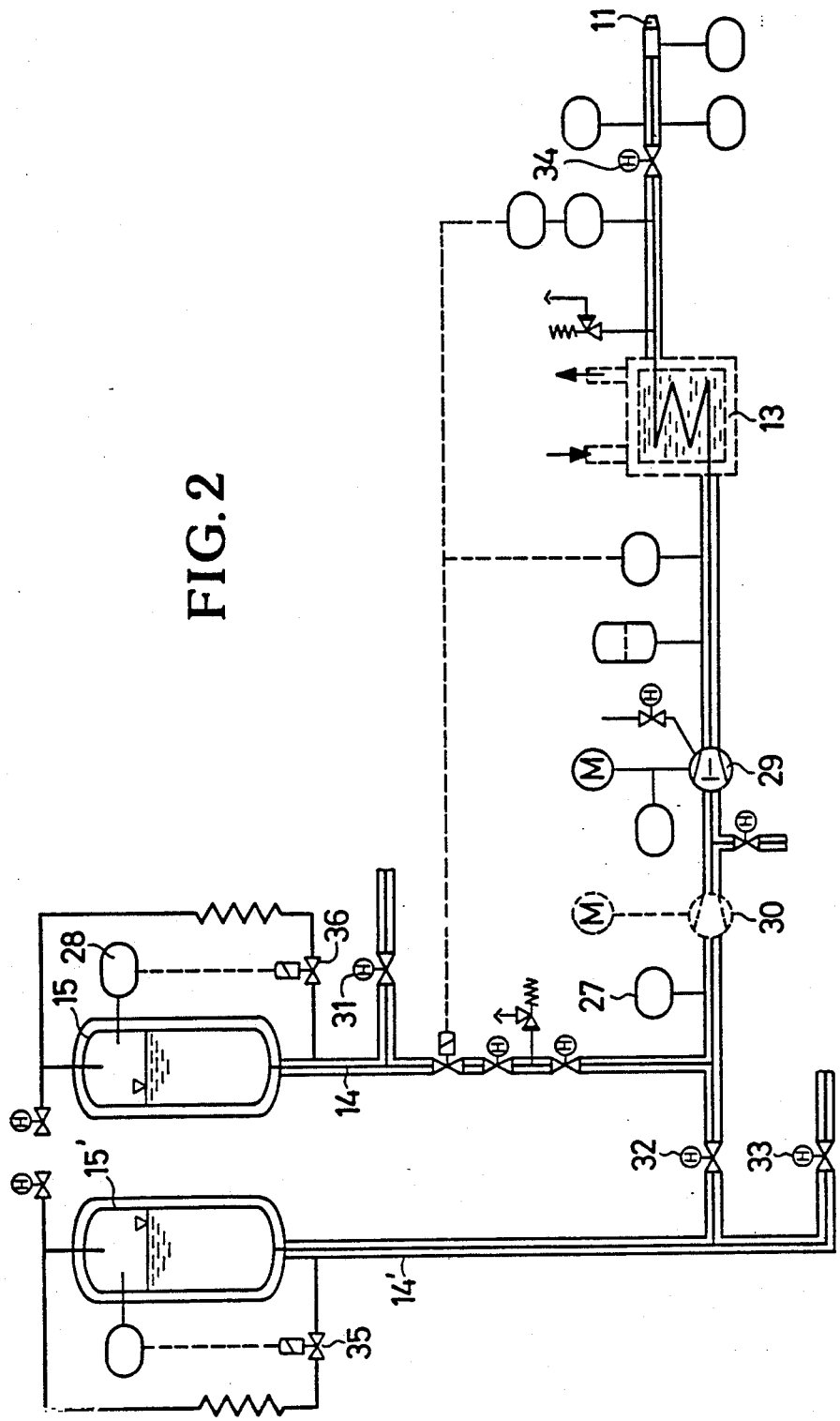
FIG. 2 is the circuit diagram for supplying the atomizing
system of the apparatus of FIG. 1 with
low-boiling liquefied gas.

As FIG. 2 shows, instead of a single gas supply tank 15, two gas supply tanks 15 and 15' can be provided, which contain liquefied nitrogen or liquefied argon. The pressure lines 14 and 14' can then be in communication with a series of pressure, temperature and flow control apparatus 27 and 28, so that before and during the process the inflow of gas to the nozzles 11, 11' and 12 can be precisely monitored and can be regulated through the high-pressure pumps 29 and 30 and the shut-off valves 31 to 36.

Four flat jet or round jet nozzles (solid jet nozzles) 11, 12, . . . , with a nozzle orifice of 0.5 to 2 mm are adjusted in their mounts such that, in the first place, they form an angle of 30 to 90 degrees from the vertical, secondly they are aimed at the axis A of the atomizing tower 8 in which the outlet spout 6 of the crucible 5 is located, and thirdly at least two each of the flat jet nozzles 11, 12, . . . intersect on a line (on a spot in the case of solid jet nozzles) which is very close to the axis of the atomizing tower 8. This prevents the molten stream 23 from missing the flat jets of gas.

An aluminum alloy is melted in a melting chamber 3 in which a crucible 5 with an outlet spout (2 to 8 mm diameter) is at the bottom and is closed by a stopper rod. The melting chamber 3 is above the atomizing tower 8 and is thermally insulated against the latter. The atomizing chamber 24 is closed off by a membrane 25.

The atomizing chamber 24 is cooled by the injection of low-boiling liquefied argon gas until liquid argon settles on the bottom of the atomizing chamber 24. The argon evaporated by the cooling of the apparatus displaces the air in the atomizing chamber 24 and creates an inert atmosphere.

In the atomizing operation, the stopper rod (not shown here) is pulled out, and the melt is formed in an outlet orifice 6 into a fine, uniform and steadily flowing stream 23 which drops onto the membrane 25 and melts it, and then drops into the atomizing chamber 24. The rate of atomizing amounts to about 4 kg of molten metal per minute; approximately 300 liters per minute of liquid argon are used for this purpose. The argon is compressed to about 250 bar and cooled ahead of the outlet opening below the boiling temperature at standard pressure.

The gas evaporated in the atomizing is carried off, and in one or more centrifugal air separators 16 it is separated from entrained fine powder particles (0.5 –10 microns), the powder particles being able to be sorted at the same time.

At the bottom of the atomizing system a pool 26 of liquid gas and coarser particles (typically greater than 10 microns) is formed. After the atomizing and the settling of the particles the liquid gas can be withdrawn through the suction line 22 and the powder can be taken from the powder collector 20, the powder accumulator 10 and the centrifugal air separator 16.

In the atomizing of molten iron alloys, four flat-jet nozzles disposed perpendicularly to one another with an orifice of 0.5 to 2 mm are adjusted so that first they form an angle of 90 to 30 degrees from the vertical, secondly they are aimed at the axis of the atomizing tower 8 in which the outlet opening 6 of the crucible 5 is located, and thirdly the flat jets intersect at least in pairs on a line which is at the shortest possible distance from the axis of the atomizing tower.

The atomizing chamber 24 is cooled by the injection of low-boiling liquefied nitrogen until liquid nitrogen settles on the bottom of the atomizing chamber 24. The nitrogen evaporated by the cooling of the apparatus displaces the air in the atomizing chamber 24 and creates a shielding gas atmosphere.

The iron alloy is melted and poured into a preheated crucible 5 which has an opening 6 (2 to 8 mm diameter) in the bottom. The crucible 5 is located above the atomizing tower 8 and is thermally insulated therefrom. The atomizing chamber 24 is sealed by a membrane 25.

In the outlet opening 6 the melt is formed into a fine, uniform and steadily flowing molten stream 23 which falls onto the membrane 24, melts it, and drops into the atomizing chamber 24. The atomizing velocity amounts to about 8 kg of melt per minute; about 300 liters per minute of liquid nitrogen is used for this purpose. The nitrogen is compressed to about 600 bar and is cooled ahead of the nozzles 11, 12, . . . to a temperature that is less than, equal to or close to the boiling temperature at standard pressure.

The gas evaporated in the atomizing is drawn away and separated from entrained fine powder particles (0.5 –10 microns) in one or more centrifugal separators 16, the powder particles being able to be sorted at the same time.

At the bottom of the atomizing apparatus a pool 26 of liquid gas and coarser particles (typically greater than 10 microns) forms. After the atomizing and after the settling of the particles the liquid gas can be let out and the powder removed.

We claim:

1. Method for the manufacture of powders from a melt of molten metal using a melting chamber, a tower below said chamber positioned to receive the melt so that the melt falls vertically downward in a stream, and an atomizing system for atomizing the melt, said method comprising injecting a low boiling liquefied gas under pressure through the atomizing system into the stream entering the tower.

2. The method of claim 1, wherein the low-boiling liquefied gas is injected at a pressure of more than 50 bar through a nozzle directed against said stream of the melt that flows vertically downward in the tower t an angle to the stream that is smaller than a right angle.

3. The method of claim 2 wherein liquie nitrogen or liquid argon is directed against the molten stream t a pressure of between 50 and 700 bar.

4. The method of claim 1, further comprising the step of adjusting the flow rate of said low-boiling liquefied gas so that the amount of heat that can be withdrawn from the falling particles of the melt by the liquid gas is more than twice the amount of heat that must be withdrawn from melt to cool it to the ambient temperature.

5. The method of claim 4, further comprising the step of adjusting the flow rate of said low-boiling liquefied gas so that the amount of heat that can be withdrawn from the falling particles of the melt by the liquid gas is eight to ten times the amount of heat that must be withdrawn from melt t cool it to the ambient temperature.

6. The method of claim 1, further comprising the step of supplying the melt to said atomizing tower in an over pressure condition.

7. The method of claim 1, further comprising the steps of melting said molten materials under vacuum or an inert gas, and delivering the melt produced under vacuum or inert gas to said atomizing means without exposure to air.

8. The method of claim 1 further comprising the step of precooling said atomizing tower before the atomizing step begins.

9. The method of claim 1, wherein a shielding gas atmosphere is provided in said tower before the atomizing step begins.

* * * * *

UNITED STATES PATENT AND TRADEMARK OFFICE
CERTIFICATE OF CORRECTION

PATENT NO. : 4,897,111
DATED : January 30, 1990
INVENTOR(S) : Sigurd Jönsson, et al It is certified that error appears in the above-identified patent and that said Letters Patent is hereby corrected as shown below:

Title page, item [73] should read:

Assignees: Leybold Aktiengesellschaft
Hanau am Main, Fed. Rep. of Germany

Messer Griesheim GmbH
Frankfurt am Main, Fed. Rep. of Germany

Signed and Sealed this

Fifth Day of March, 1991

Attest:

HARRY F. MANBECK, JR.

*Attesting Officer*     *Commissioner of Patents and Trademarks*